US012767831B2

(12) United States Patent
Kim et al.

(10) Patent No.: US 12,767,831 B2
(45) Date of Patent: Oct. 20, 2026

(54) CUBIC BORON NITRIDE POWDER AND MANUFACTURING METHOD THEREFOR

(71) Applicants: LG ELECTRONICS INC., Seoul (KR); RESEARCH & BUSINESS FOUNDATION SUNGKYUNKWAN UNIVERSITY, Gyeonggi-do (KR)

(72) Inventors: Byungsung Kim, Seoul (KR); Dongmok Whang, Gyeonggi-do (KR); Wonseok Jang, Gyeonggi-do (KR); Inhwan Lee, Gyeonggi-do (KR); Hyeonsik Jang, Gyeonggi-do (KR)

(73) Assignees: LG ELECTRONICS INC., Seoul (KR); RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 399 days.

(21) Appl. No.: 18/245,644

(22) PCT Filed: Aug. 25, 2021

(86) PCT No.: PCT/KR2021/011347
§ 371 (c)(1),
(2) Date: Mar. 16, 2023

(87) PCT Pub. No.: WO2022/059952
PCT Pub. Date: Mar. 24, 2022

(65) Prior Publication Data

US 2024/0026161 A1 Jan. 25, 2024

(30) Foreign Application Priority Data

Sep. 21, 2020 (KR) ........................ 10-2020-0121266

(51) Int. Cl.
*C09C 3/06* (2006.01)
*C09C 1/40* (2006.01)
*C09C 1/62* (2006.01)

(52) U.S. Cl.
CPC .............. *C09C 3/063* (2013.01); *C09C 1/407* (2013.01); *C09C 1/627* (2013.01);
(Continued)

(58) Field of Classification Search
CPC ... C01B 21/06; C01B 21/064; C01B 21/0646; C01B 21/0648; C01P 2002/72;
(Continued)

(56) References Cited

U.S. PATENT DOCUMENTS 4,762,729 A * 8/1988 Hirano ................ C04B 41/5064
427/372.2
5,137,772 A * 8/1992 Watanabe ........... C23C 14/0647
428/688

FOREIGN PATENT DOCUMENTS

CN 106513695 3/2017
JP 07-089780 4/1995
(Continued)

OTHER PUBLICATIONS

English Machine Translation: Hirano et al. (JP H07-089780).*
(Continued)

*Primary Examiner* — Holly Rickman
*Assistant Examiner* — Linda N Chau
(74) *Attorney, Agent, or Firm* — LEE, HONG, DEGERMAN, KANG & WAIMEY

(57) ABSTRACT

Boron nitride powder according to an embodiment includes a core and a shell surrounding the outside of the core, wherein the core includes at least one metal material of Ti, V, Cr, Mn, Fe, Co, Ni, Cu, and Zn or at least one ceramic
(Continued)

material of Al2O3, ZrO2, ZnO, MgO, SiC, AlN, Si3N4, and SiO2, wherein the shell comprises boron nitride.

6 Claims, 7 Drawing Sheets

(52) U.S. Cl.
CPC ...... *C01P 2002/72* (2013.01); *C01P 2002/76* (2013.01); *C01P 2002/82* (2013.01); *C01P 2004/03* (2013.01); *C01P 2004/04* (2013.01); *C01P 2004/80* (2013.01)

(58) Field of Classification Search
CPC ............. C01P 2002/76; C01P 2002/82; C01P 2004/03; C01P 2004/04; C01P 2004/80; C04B 2235/3206; C04B 2235/3217; C04B 2235/3244; C04B 2235/3284; C04B 2235/3418; C04B 2235/3826; C04B 2235/3865; C04B 2235/3873; C04B 2235/40; C04B 35/5831; C04B 35/62836; C04B 35/62897; C09C 1/407; C09C 1/627; C09C 3/063
See application file for complete search history.

(56) References Cited

FOREIGN PATENT DOCUMENTS

| | | |
|---|---|---|
| KR | 10-2003-0040386 | 5/2003 |
| KR | 10-2017-0046570 | 5/2017 |
| KR | 10-2017-0100600 | 9/2017 |

OTHER PUBLICATIONS

English Machine Translation: Yagi et al. (JP 61-266576).*
European Patent Office Application Serial No. 21869575.7, Search Report dated Oct. 11, 2024, 9 pages.
Wang, et al., "Fabrication of Machinable Silicon Carbide-Boron Nitride Ceramic Nanocomposites," Journal of American Ceramic Society, vol. 87, No. 4, Apr. 2004, 6 pages.
PCT International Application No. PCT/KR2021/011347, International Search Report dated Dec. 7, 2021, 4 page.

* cited by examiner

【Fig. 1】
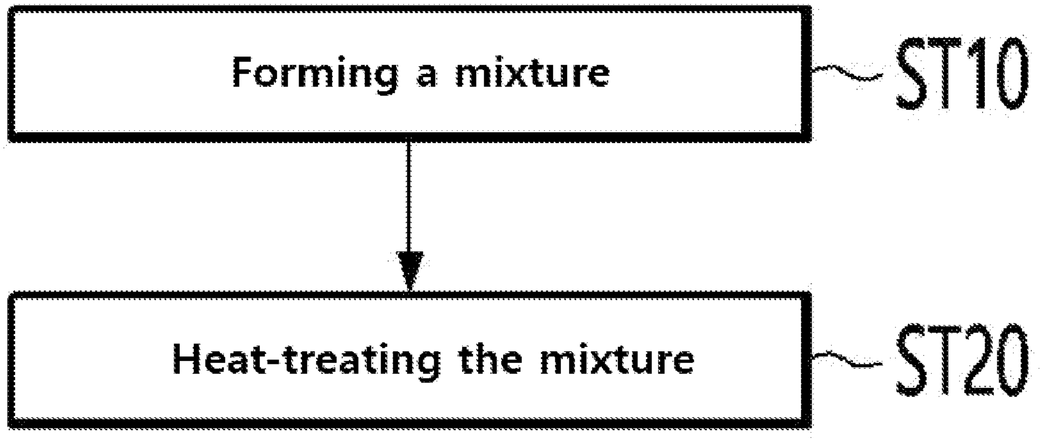
【Fig. 2】
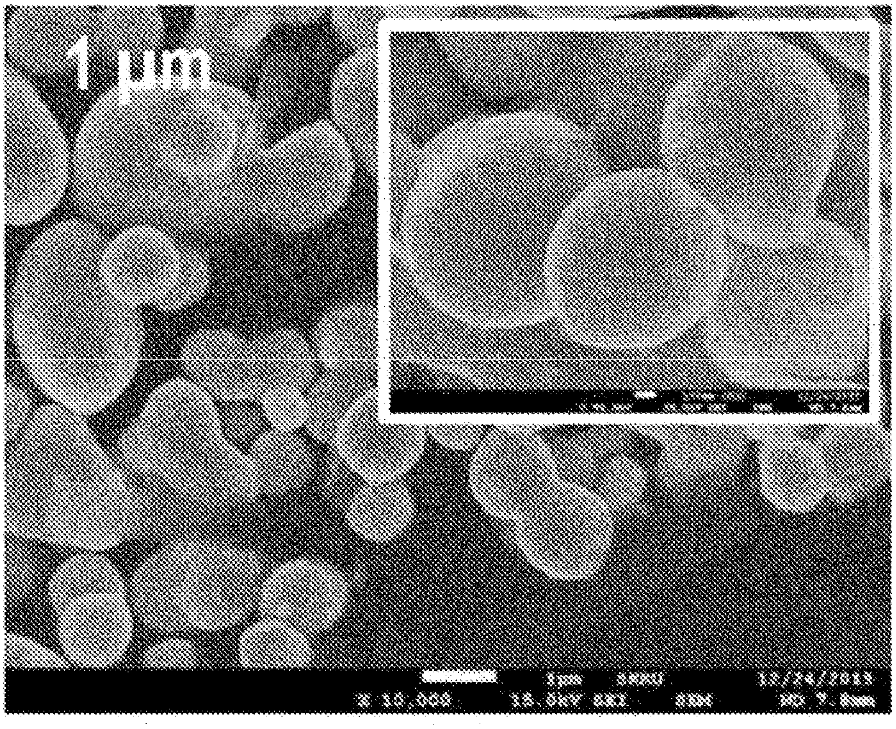

【Fig. 3】
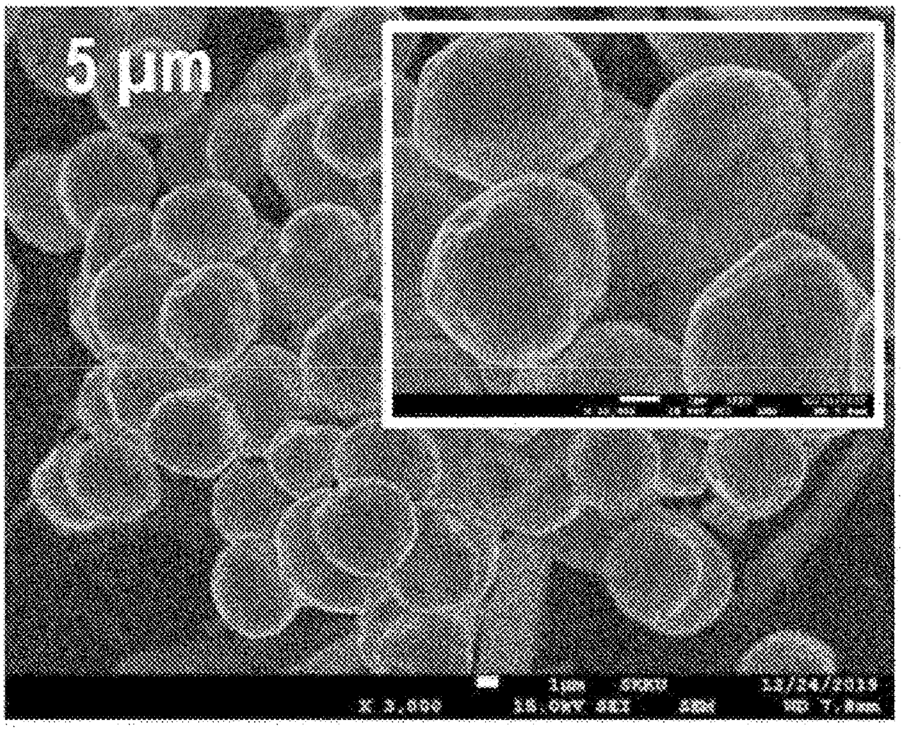

【Fig. 4】
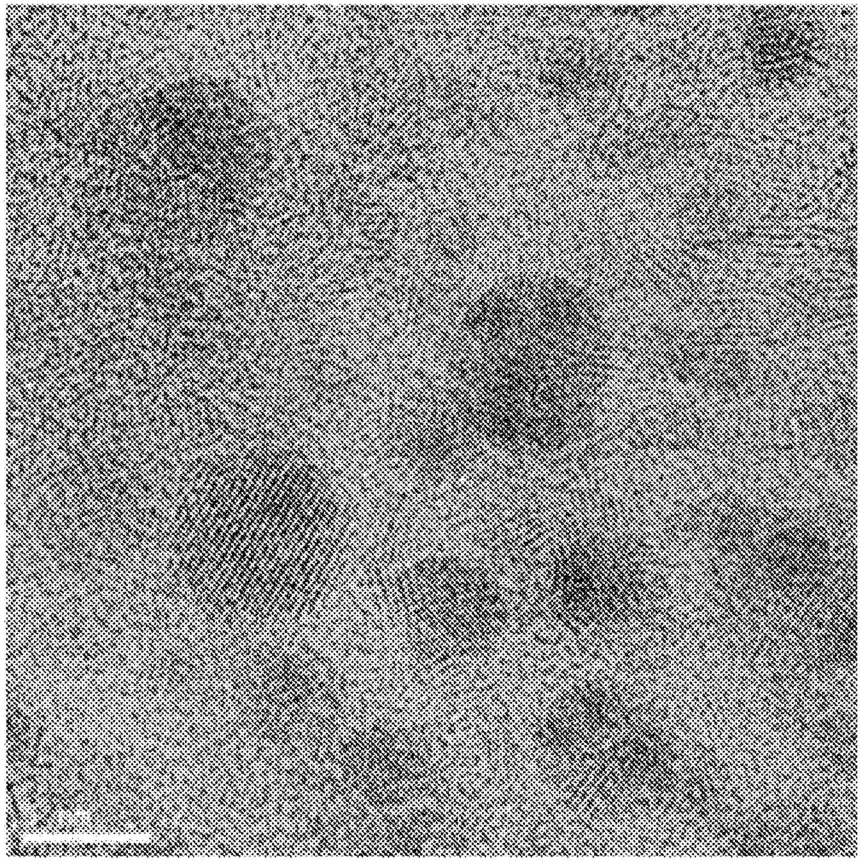

【Fig. 5】
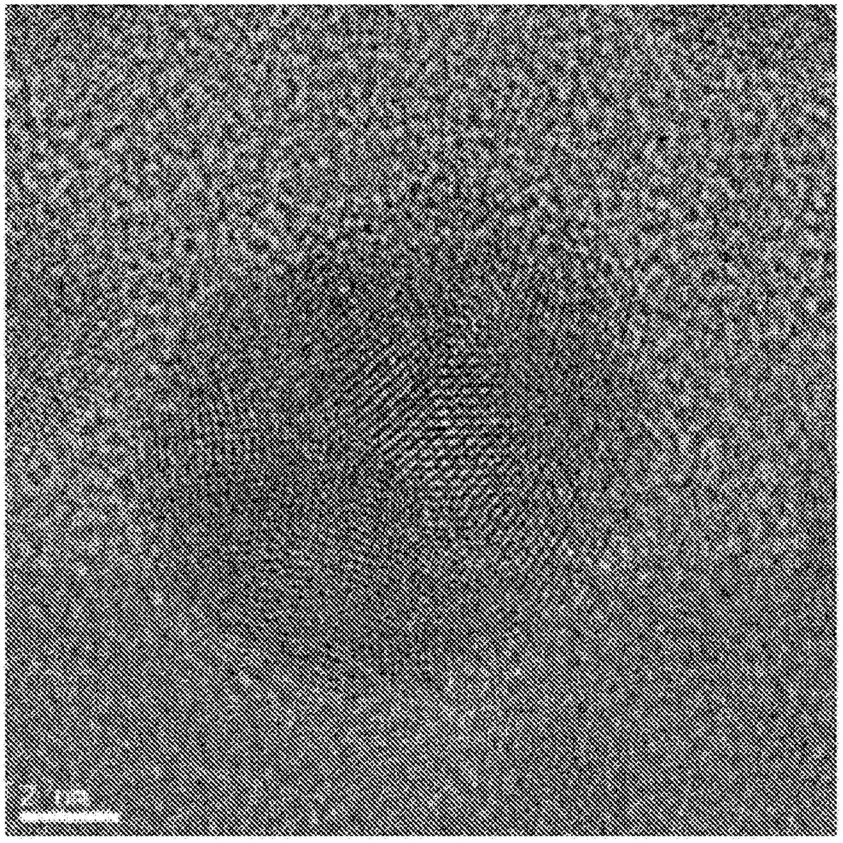

【Fig. 6】
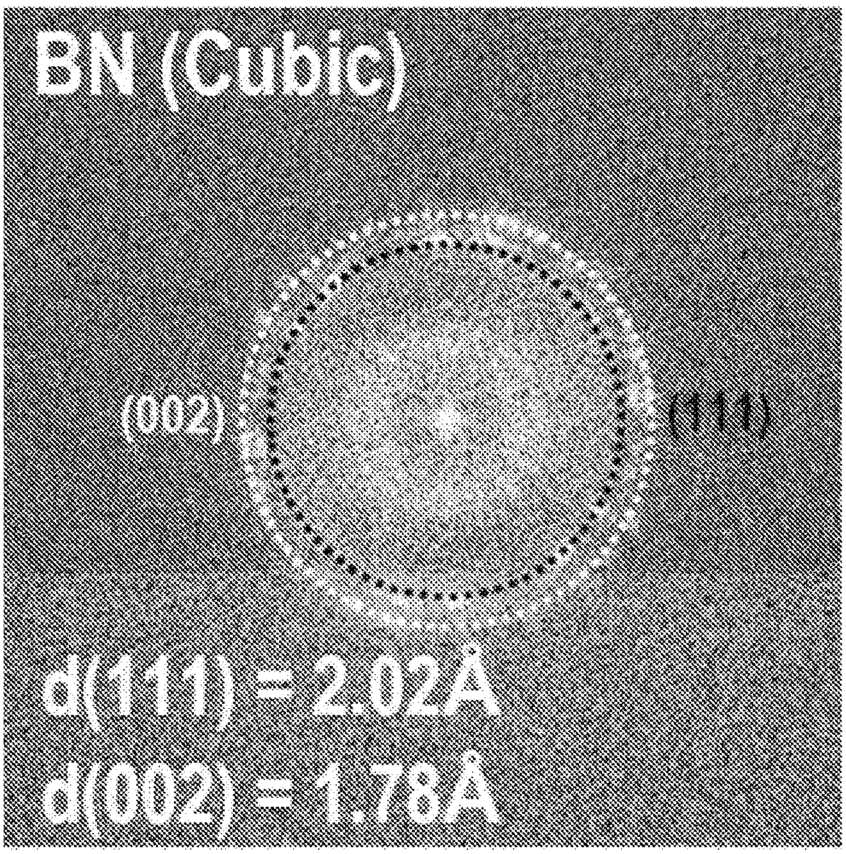

【Fig. 7】
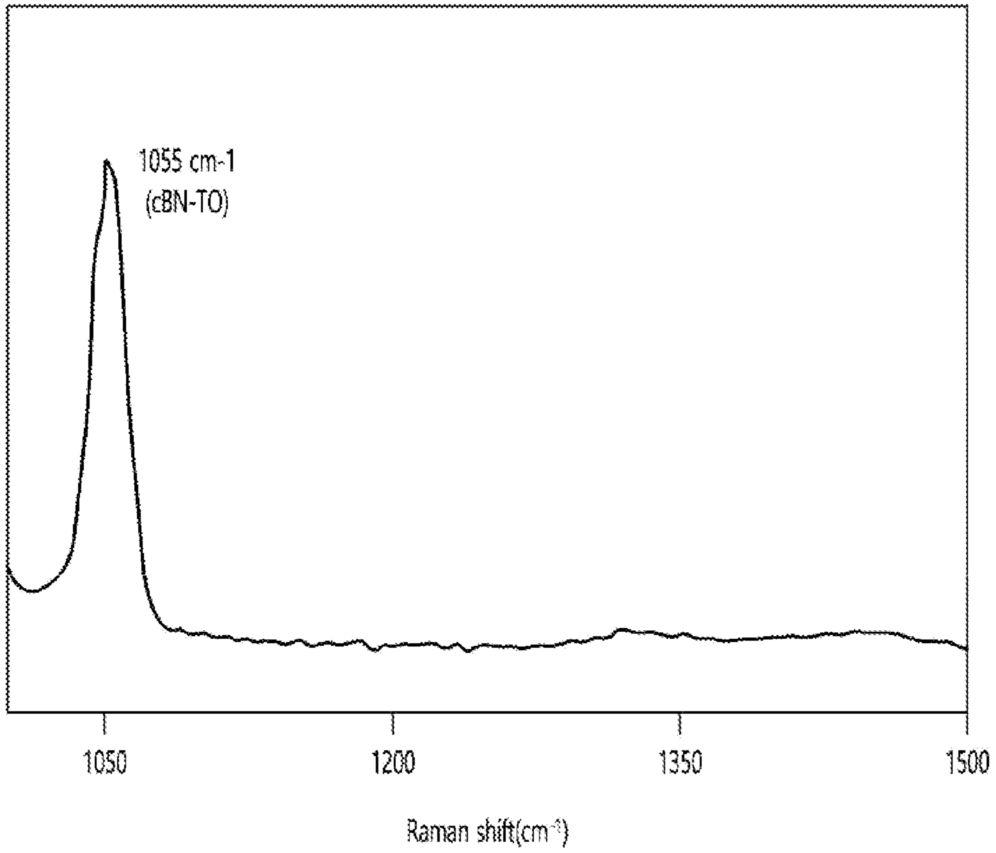

【Fig. 8】
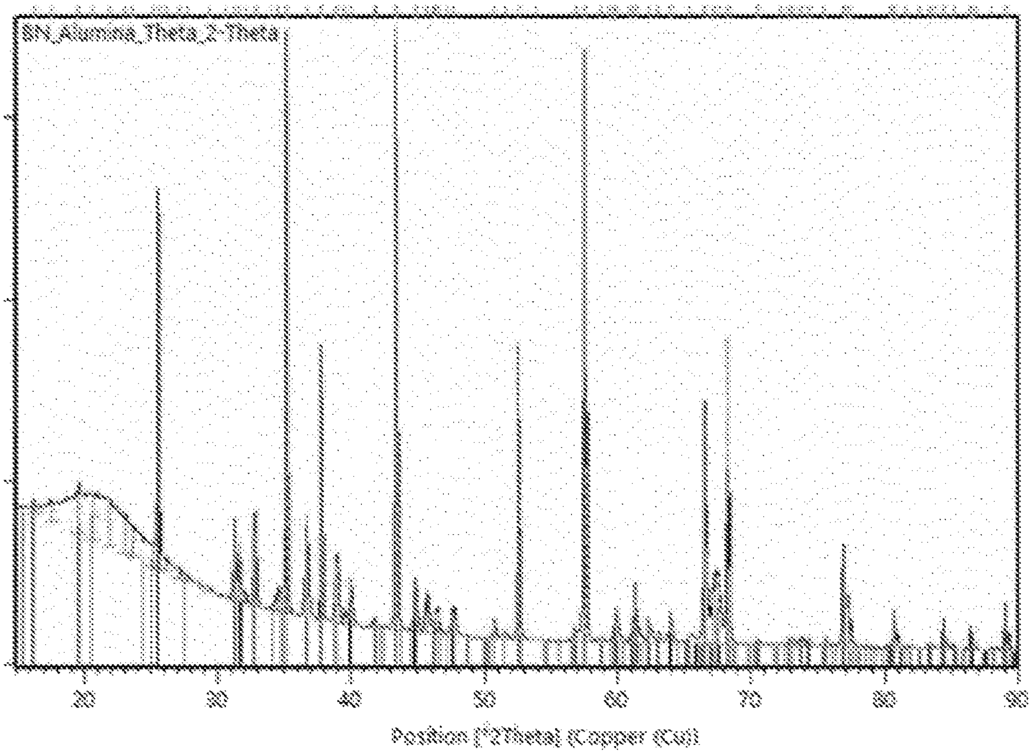
| Label | Phase | Structure | Space group | Phase Analysis |
|---|---|---|---|---|
| Blue | $Al_2O_3$-Alpha | Hexagonal | R -3 c | 31.9 |
| Green | $Al_2O_3$-Theta | Monoclinic | C 1 2/m 1 | 16.2 |
| Gray | BN | Monoclinic | C 1 m 1 | 51.9 |

CUBIC BORON NITRIDE POWDER AND MANUFACTURING METHOD THEREFOR

CROSS-REFERENCE TO RELATED APPLICATION(S)

This application is the National Stage filing under 35 U.S.C. 371 of International Application No. PCT/KR2021/011347, filed on Aug. 25, 2021, which claims the benefit of earlier filing date and right of priority to Korean Application No. 10-2020-0121266, filed on Sep. 21, 2020, the contents of which are all hereby incorporated by reference herein in their entireties.

TECHNICAL FIELD

An embodiment relates to a cubic boron nitride powder and manufacturing method therefor.

BACKGROUND ART

As cemented carbide is widely used as a micro tool material for micro mold processing, micro tools using single-crystal and poly-crystal diamond materials have recently been introduced. However, it is expensive, difficult to manufacture tools, and in particular, processing materials are limited to non-ferrous metals due to carbon diffusion, so there is a problem that it cannot be applied to ferrous metals such as mold steel.

Accordingly, a polycrystalline cubic boron nitride (PCBN) tool, which has high hardness and is applicable to mold steel processing, is used instead of a diamond material. Polycrystalline cubic boron nitride (PCBN) is produced by sintering cubic boron nitride powder with various ceramics.

Cubic boron nitride (CBN) has a high hardness and excellent thermal conductivity next to diamond, and has a lower reactivity with iron than diamond. As a result, tools containing the cubic boron nitride have been used for finishing cutting of cast iron or for high-speed cutting of sintered alloys and difficult-to-cut materials.

Meanwhile, the cubic boron nitride may be formed by heat-treating a mixture of a nitride precursor and a boron precursor or by heat-treating a mixture of a boron nitride precursor.

However, the process of forming the cubic boron nitride may be performed at a pressure of about 13 GPa or more and a temperature of 2500° K to 4000° K, and due to these high-pressure and high-temperature process conditions, there are limitations in mass production of the cubic boron nitride.

In addition, after forming the cubic boron nitride powder, there is a problem in that post-processing is difficult due to the high hardness of the cubic boron nitride powder when changing the particle size of the cubic boron nitride powder.

Therefore, a method for producing the cubic boron nitride powder capable of solving the above problems is required.

DISCLOSURE

Technical Problem

An embodiment relates to a cubic boron nitride powder that may be easily produced and processed easily, and a manufacturing method thereof.

Technical Solution

A boron nitride powder according to an embodiment includes a core and a shell surrounding the outside of the core, the core includes a metal material of at least one of Ti, V, Cr, Mn, Fe, Co, Ni, Cu, and Zn, or a ceramic material of at least one of Al2O3, ZrO2, ZnO, MgO, SiC, AlN, Si3N4, and SiO2, the shell includes boron nitride.

Advantageous Effects

In the method for manufacturing cubic boron nitride powder according to the embodiment, the temperature and pressure of the process for manufacturing cubic boron nitride powder may be reduced as the metal or silicon catalyst is included as an additive.

That is, since the cubic boron nitride powder may be produced in a low-temperature and low-pressure process, the manufacturing process efficiency of the cubic boron nitride powder may be improved.

In addition, the particle size and shape of the cubic boron nitride powder produced by the method for manufacturing cubic boron nitride powder is changed according to the shape and particle size of the catalyst to be added.

That is, the finally produced cubic boron nitride powder may have a core-shell structure by reacting boron nitride and the surface of the additive powder.

Accordingly, the cubic boron nitride powder may be formed in a shape same to or similar to that of the additive powder included in the core, and may be formed in a particle size similar to that of the additive powder.

Accordingly, it is possible to produce the cubic boron nitride powder having a desired particle size and shape by changing the type of additive powder according to the desired particle size and shape without the need for post-processing of the cubic boron nitride powder.

DESCRIPTION OF DRAWINGS

FIG. 1 is a view for explaining a process flow chart of a method for manufacturing cubic boron nitride according to an embodiment.

FIGS. 2 and 3 are scanning electron microscope (SEM) pictures of cubic boron nitride powder formed by a method for manufacturing cubic boron nitride according to an embodiment.

FIGS. 4 to 6 are transmission electron microscope (TEM) pictures of cubic boron nitride powder formed by the method for manufacturing cubic boron nitride according to the embodiment.

FIG. 7 is a graph obtained by measuring cubic boron nitride powder formed by the method for manufacturing cubic boron nitride according to the embodiment with a Raman spectrometer.

FIG. 8 is an X-ray diffraction analysis graph of cubic boron nitride powder formed by the method for manufacturing cubic boron nitride according to the embodiment.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, with reference to the drawings, a cubic boron nitride powder and a manufacturing method thereof according to an embodiment will be described.

Referring to FIG. 1, a method for manufacturing cubic boron nitride powder according to an embodiment may include forming a mixture (ST10) and heat-treating the mixture (ST20).

In the step of forming the mixture (ST10), materials to be raw materials of the cubic boron nitride powder may be prepared and then the raw materials may be mixed.

The mixture may include the cubic boron nitride precursor powder and additive powder.

The cubic boron nitride precursor powder may include at least one of a boron precursor powder, a nitrogen precursor powder, and a boron nitride precursor powder. For example, the cubic boron nitride precursor may include a boron precursor powder and a nitrogen precursor powder. Alternatively, the cubic boron nitride precursor may include a boron nitride precursor powder.

The boron precursor powder may include boric acid and sodium borohydride. In addition, the nitrogen precursor powder may include melamine, urea, ammonia, and ammonium chloride. In addition, the boron nitride precursor powder may include borazine, polyborazylene, and trichloroborazine.

In addition, the additive powder may include at least one of metal and ceramic materials. For example, the additive may include at least one metal material selected from Ti, V, Cr, Mn, Fe, Co, Ni, Cu, and Zn. Alternatively, the additive may include at least one ceramic material selected from $Al_2O_3$, $ZrO_2$, ZnO, MgO, SiC, AlN, $Si_3N_4$, and $SiO_2$.

The additive may be a kind of catalyst that does not react with the boron nitride precursor powder and reacts with boron nitride formed by the reaction of the boron nitride precursors.

The cubic boron nitride precursor powder and the additive powder may be mixed. In detail, the cubic boron nitride precursor powder and the additive powder may be included in different weight %. In detail, the additive powder may be included in a greater amount than the boron nitride precursor powder. In detail, the boron nitride precursor powder may be included by 10% to 50% of the additive powder.

When the boron nitride precursor powder is included in less than 10% of the additive powder, the amount of the remaining additive may increase. In addition, when the boron nitride precursor powder is included in an amount greater than 50% with respect to the additive powder, the amount of boron nitride that does not react with the additive powder among the boron nitrides formed by the boron nitride precursor powder is increased, and thus the characteristics of the cubic boron nitride powder may decrease.

The cubic boron nitride precursor powder and the additive powder may be mixed in various ways. For example, the cubic boron nitride precursor powder and the additive powder were each added to the DI water solution at a weight % within the weight % range and stirred, thereby mixing the cubic boron nitride precursor powder and the additive powder. Then, the DI water solution may be dried to form a mixed powder in which the cubic boron nitride precursor powder and the additive powder are mixed.

Subsequently, in the step of heat-treating the mixture (ST20), the prepared mixture may be heat-treated at a constant temperature and pressure to react the cubic boron nitride precursor powder and the additive powder.

In detail, after the mixture is introduced into the reactor, heat treatment may be performed by heating the temperature inside the reactor to 500° C. to 1000° C. by applying an electric current to a heat source that transfers heat to the reactor.

In this case, the process pressure may be about 300 Pa or less. In detail, heat treatment may be performed for about 2 to 3 hours at a pressure of 100 Pa to 300 Pa in a gas atmosphere containing nitrogen such as $N_2$, $NH_3$, $N_2O$, NO, and $NO_2$.

Thus, cubic boron nitride powder was finally formed.

By heat-treating the mixture, the cubic boron nitride precursor powder and the additive powder may react.

In detail, the boron nitride precursor powders may react with each other to form boron nitride. In addition, the boron nitride may react with the additive powder.

The boron nitride may react with the surface of the additive powder. Accordingly, the cubic boron nitride powder may be formed in a core-shell structure.

In detail, the cubic boron nitride precursor powder may have a core-shell structure in which an inner core includes an additive powder and an outer shell includes boron nitride.

That is, the cubic boron nitride precursor powder may be formed in a core-shell structure, the inner core may include at least one metal material selected from among Ti, V, Cr, Mn, Fe, Co, Ni, Cu, and Zn, or at least one ceramic material selected from among $Al_2O_3$, $ZrO_2$, ZnO, MgO, SiC, AlN, $Si_3N_4$, and $SiO_2$, and the outer shell may include boron nitride.

Accordingly, the shape of the finally produced cubic boron nitride powder may be formed while maintaining the shape of the additive powder. That is, since boron nitride formed by the boron nitride precursor reacts with and deposits the surface of the additive powder, the shape of the finally produced cubic boron nitride powder may be formed in the same or similar shape as that of the additive powder.

In addition, the particle diameter of the finally produced cubic boron nitride powder may be formed to have a particle diameter similar to that of the additive powder. That is, since the boron nitride formed by the boron nitride precursor is formed to a nanoscale thickness on the surface of the additive powder, the particle size of the finally produced cubic boron nitride powder may be formed to have a particle size almost similar to that of the additive powder.

Accordingly, it is possible to easily control the shape and particle size of the cubic boron nitride powder prepared according to the method for manufacturing cubic boron nitride powder according to the embodiment.

That is, when the shape and particle size of the cubic boron nitride powder are changed by post-processing after manufacturing the cubic boron nitride powder, processing is not easy due to the hardness of the cubic boron nitride powder, which reduces process efficiency. However, since the boron nitride powder produced by the cubic boron nitride powder manufacturing method according to the embodiment can be prepared by different types of additive powders according to the desired shape and particle size of the cubic boron nitride powder, after preparing the cubic boron nitride powder, post-processing does not require.

Accordingly, since the method for manufacturing cubic boron nitride powder according to the embodiment can produce cubic boron nitride powder of various shapes and sizes according to the size and particle diameter of the desired cubic boron nitride powder, the cubic boron nitride powder produced by the method for manufacturing cubic boron nitride powder according to the embodiment may be applied to various fields such as high heat dissipation electrical insulation materials and electromagnetic wave shielding materials having high thermal conductivity and thermal isotropy.

In addition, the method for manufacturing cubic boron nitride powder according to the embodiment may produce cubic boron nitride powder at low temperature and low pressure.

That is, due to the mixing of the additives, epitaxial growth may be induced at the interface, and thus nucleation energy may be reduced. Therefore, the cubic boron nitride powder according to the embodiment may stably form the cubic boron nitride powder even at a low temperature of about 500° C. to 1000° C. and a low pressure of 100 Pa to 300 Pa.

Hereinafter, the present invention will be described in more detail through the manufacturing method of cubic boron nitride powder according to Embodiment Examples and Comparative Examples. These production examples are only presented as examples in order to explain the present invention in more detail. Therefore, the present invention is not limited to these production examples.

Embodiment Example 1

After mixing 1 g of boric acid and 0.679 g of melanin at a mol ratio of 3:1, reacting in 100 ml of DI Water solvent at 80° C. for 3 hours, a precursor was formed through precipitation. Subsequently, 1 g and 0.1 g of copper powder and precursor powder were added to DI water solvent, respectively, and then evaporated to form a mixture. Subsequently, the mixture was synthesized by heat treatment at a process temperature of 500° C. to 1000° C. at a pressure of 150 Pa to produce boron nitride powder. As the reaction atmosphere, hydrogen gas and nitrogen dioxide gas containing nitrogen were injected at flow rates of 23 sccm and 500 sccm, respectively, and heat treatment was performed for about 3 hours.

Subsequently, the crystal phase of the boron nitride powder produced was observed.

Embodiment Example 2

Boron nitride powder was produced in the same manner as in Example 1, except that cobalt powder was added instead of copper powder.

Subsequently, the crystal phase of the boron nitride powder produced was observed.

Comparative Example 1

Boron nitride powder was produced in the same manner as in Example 1, except that the copper powder was not included in the mixture.

Subsequently, the crystal phase of the boron nitride powder produced was observed.

Comparative Example 2

Boron nitride powder was produced in the same manner as in Example 1, except that the process temperature was 300° C.

Subsequently, the crystal phase of the boron nitride powder produced was observed.

TABLE 1

| | Formation of boron nitride powder | crystal phase |
|---|---|---|
| Embodiment Example1 | OK | cubic |
| Embodiment Example2 | OK | cubic |
| Comparative Example1 | OK | cubic |
| Comparative Example2 | NG | — |

FIGS. 2 to 6 are scanning electron micrographs and transmission electron micrographs of boron nitride powder according to Example 1.

7 is a graph obtained by measuring cubic boron nitride powder formed by the method for manufacturing cubic boron nitride according to the embodiment with a Raman spectrometer.

Referring to Table 1 and FIGS. 2 and 3, it can be seen that the boron nitride powder according to the embodiments is stably formed, and the crystal phase of the boron nitride powder has a cubic structure.

That is, it can be seen that the boron nitride powder produced by the method for manufacturing boron nitride powder according to the embodiment is a cubic boron nitride powder.

Meanwhile, it can be seen that boron nitride powder according to Comparative Examples does not form boron nitride powder, or amorphous boron nitride powder is formed.

In addition, referring to FIGS. 4 to 6, it can be seen that the cubic boron nitride powder produced by the method for manufacturing boron nitride powder according to the embodiment is formed in a core-shell structure in which boron nitride is deposited on the surface of the additive powder.

In addition, referring to FIG. 7, it can be seen that the cubic boron nitride powder prepared by the method for manufacturing boron nitride powder according to the embodiment measured by Raman spectroscopy has a cubic crystal phase peak.

Accordingly, it can be seen that the cubic boron nitride powder produced by the method for manufacturing boron nitride powder according to the embodiments is formed with the same or similar shape and particle size of the powder as the shape and particle size of the additive powder as the core.

Accordingly, the cubic boron nitride powder produced by the method for manufacturing boron nitride powder according to the embodiments does not undergo a separate post-processing after manufacture, and when preparing the cubic boron nitride powder, the shape and size of the cubic boron nitride powder may be controlled according to desired properties.

Embodiment Example 3

After mixing 1 g of boric acid and 0.679 g of melanin at a mol ratio of 3:1, reacting in 100 ml of DI Water solvent at 80° C. for 3 hours, a precursor was formed through precipitation. Subsequently, 1 g and 0.1 g of aluminum oxide powder and precursor powder were added to DI water solvent, respectively, and then evaporated to form a mixture. Subsequently, the mixture was synthesized by heat treatment at a process temperature of 500° C. to 1000° C. at a pressure of 150 Pa to produce boron nitride powder. As the reaction atmosphere, hydrogen gas and nitrogen dioxide gas containing nitrogen were injected at flow rates of 23 sccm and 500 sccm, respectively, and heat treatment was performed for about 3 hours.

Subsequently, the crystal phase of the boron nitride powder produced was observed.

Referring to FIG. 8, it can be seen that the shape of the cubic boron nitride powder according to the embodiment is changed according to the shape of the catalyst to be added.

That is, since the cubic boron nitride powder according to the embodiment reacts with the surface of the catalyst powder to form a core-shell structure, the shape of the cubic boron nitride powder may be determined according to the shape of the catalyst included in the mixture.

In the method for manufacturing cubic boron nitride powder according to the embodiment, the temperature and pressure of the process for manufacturing cubic boron nitride powder may be reduced as the metal or silicon catalyst is included as an additive.

That is, since the cubic boron nitride powder may be produced in a low-temperature and low-pressure process, the manufacturing process efficiency of the cubic boron nitride powder may be improved.

In addition, the particle size and shape of the cubic boron nitride powder produced by the method for manufacturing cubic boron nitride powder is changed according to the shape and particle size of the catalyst to be added.

That is, the finally produced cubic boron nitride powder may have a core-shell structure by reacting boron nitride and the surface of the additive powder.

Accordingly, the cubic boron nitride powder may be formed in a shape same to or similar to that of the additive powder included in the core, and may be formed in a particle size similar to that of the additive powder.

Accordingly, it is possible to produce the cubic boron nitride powder having a desired particle size and shape by changing the type of additive powder according to the desired particle size and shape without the need for post-processing of the cubic boron nitride powder.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

What is claimed is:

1. A method for manufacturing a cubic boron nitride powder comprising:

forming a mixture by mixing a boron nitride precursor powder and an additive powder; and heat-treating the mixture to form the cubic boron nitride powder having a core and a shell surrounding an outside of the core, wherein the additive powder for the core includes at least one of Ti, V, Cr, Mn, Fe, Co, Ni, Cu, or Zn, wherein in the heat-treating the mixture, the boron nitride precursor powder is configured to react to form a boron nitride, and the boron nitride is configured to react with a surface of the additive powder to form the shell surrounding the outside of the core, wherein the shell comprises the boron nitride, wherein a crystal phase of the boron nitride has a cubic crystal phase, wherein the shell is directly in-contact with the surface of the additive powder for the core without an intermediate layer, and wherein the heat-treating the mixture includes an epitaxial growth of the cubic boron nitride powder at the surface of the additive powder for the core, wherein the additive powder is configured to form the core as a single and continuous layer.

2. The method of claim 1, wherein the additive powder includes a greater content than the boron nitride precursor powder, wherein the boron nitride precursor powder includes 10% to less than 50% of the additive powder.

3. The method of claim 1, wherein the heat-treating the mixture is performed at a temperature of 500° C. to 1000° C.

4. The method of claim 3, wherein the heat-treating the mixture is performed at a pressure of 100 Pa to 300 Pa in a gas atmosphere including nitrogen.

5. The method of claim 1, wherein the heat-treating the mixture includes changing a shape of the cubic boron nitride powder according to a shape of the core, and wherein the shape of a finally produced cubic boron nitride powder is formed in a same or substantially same shape as that of the additive powder for the core.

6. The method of claim 1, wherein the heat-treating the mixture includes changing a particle size of the cubic boron nitride powder according to a particle size of the additive powder, and wherein a particle size of a finally produced cubic boron nitride powder is formed to have a particle size substantially same to that of the additive powder.

* * * * *